Aug. 26, 1930.  A. H. NEULAND  1,773,845
ELECTRIC SYSTEM FOR VEHICLES
Filed July 30, 1928
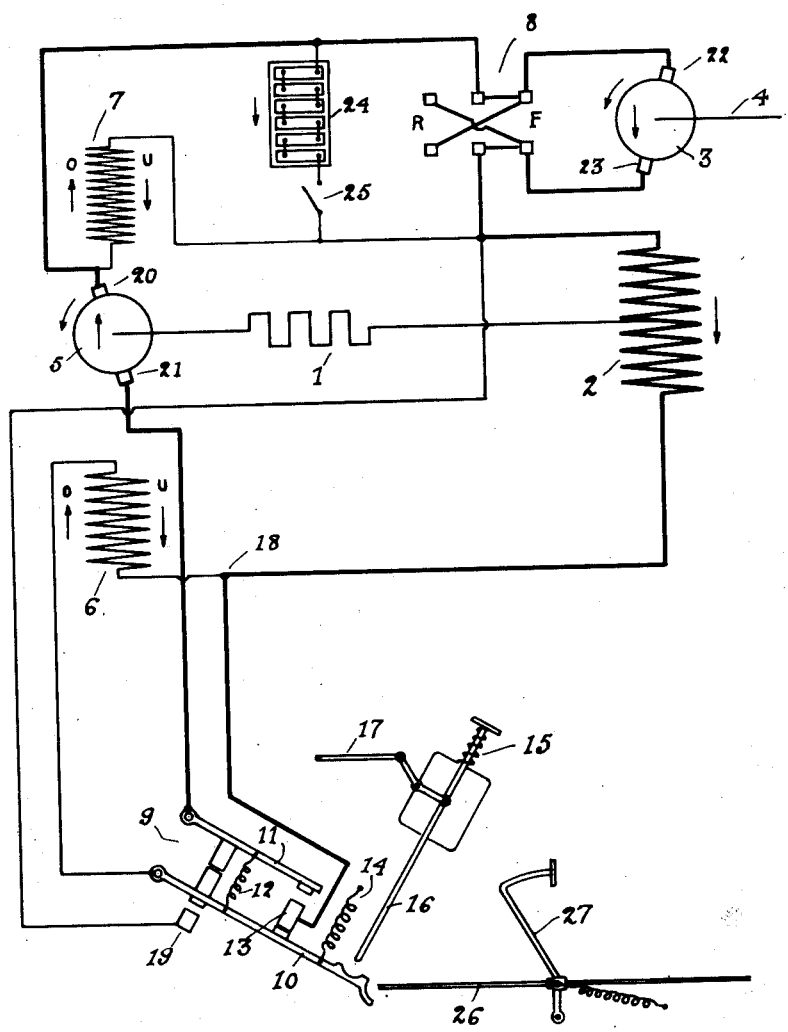
INVENTOR Patented Aug. 26, 1930

1,773,845

UNITED STATES PATENT OFFICE

ALFONS HENRY NEULAND, OF IRVINGTON, NEW JERSEY, ASSIGNOR TO ELECTRO-MOBILE CORPORATION, OF IRVINGTON, NEW JERSEY

ELECTRIC SYSTEM FOR VEHICLES

Application filed July 30, 1928. Serial No. 296,299.

This invention relates to improved methods and means for electromagnetically transmitting power from a prime mover to a load and particularly to the type of apparatus in which two dynamos cooperate with the power source and load for transmitting power therebetween.

In my copending application Serial #292,195 filed July 12, 1928 for electric systems for vehicles, I disclosed a method for varying the torque and speed relationships and the field of one of the dynamos by movement of the engine throttle mechanism.

The objects of the present invention are to provide a simplified field winding for one of the dynamos and an improved switch, preferably controlled by the movement of the vehicle controls, to variously connect the field coil of one of the dynamos in order to effectively control engine and vehicle speeds within wide limits.

Other objects are to provide an apparatus particularly adapted for operating a vehicle with an internal combustion engine, to provide an improved method for changing the field relationship between the dynamos and to provide means cooperating with the vehicle brake mechanism for starting engine from a battery.

Another object is to proportion and connect the field windings with one another so as to produce a powerful torque for forward operation of vehicle and to change the field connections so as to produce a substantial torque for operation of vehicle in reverse direction and to operate the vehicle at high speed with moderate engine speed.

Still another object is to adjust the clutch and booster brushes away from the neutral point to automatically aid in changing the clutch and booster torque relationship, as the clutch armature or the booster field are reversed.

Still other objects and advantages of my system will appear from the following description and appended drawing in which The single figure is a wiring diagram showing schematically the relationship between the electrical and mechanical elements of my system and the engine, propeller, accelerator and brake on the vehicle.

Referring to drawing, the vehicle engine is represented by the crank shaft 1 which drives the field coil 2 mounted on the field system of the clutch dynamo. The clutch armature 3 is connected to and drives the propeller shaft of the vehicle represented by 4. The booster dynamo has an armature 5 operatively connected to engine shaft and is provided with a field coil 6 having preferably a higher resistance and a larger number of turns than the clutch coil 2. The booster field may be provided with a shunt coil 7 receiving a current from clutch armature 3 in direction of arrow U when propeller shaft under-speeds engine and from armature 5 in direction of arrow O when propeller shaft overspeeds, or when it operates in reverse direction. A switch 8 is provided to reverse the armature connections for reversing the propeller shaft and the vehicle when in position R.

In order to variously operate engine and vehicle, I provide a control switch 9 having pivoted contact fingers 10 and 11 normally held closed by the spring 12 and a field contact 13 normally held closed with the finger 10 by the spring 14. The switch is operated by movement of the accelerator mechanism rod 16, having a suitable connection with the engine throttle, not shown, such as a rod 17.

Assuming that the accelerator is released and the engine is operating at its idling speed, the connections established by the control switch conduct any slight load current flowing at this time from the clutch armature 3, thru field coil 2, contacts 13, 10 and 11 thru armature 5 and thru switch 8, in position F for forward operation, back to armature 3. The coil 6 is short circuited and the booster is practically non-effective except for the coil 7 which at this time receives a very slight current from armature 3 in direction of arrow U and so establishes a slight motoring flux in booster field. The slight counter potential generated by booster prevents the load current from building up and from stalling the engine while the throttle remains practically closed and the vehicle at rest.

The accelerator may be adjusted to partly open the throttle before depressing the finger 10 in order to avoid shock in applying torque to propeller and in starting the vehicle. This increases engine speed, voltage of armature 3, current in coil 7 and the booster motoring action, builds up load current and torque and sets the vehicle in motion. A further depression of accelerator opens the contacts 13 and 10. The load current from the junction point 18 now traverses the coil 6 in direction of arrow O in opposition to current in coil 7. This immediately reduces booster flux and motoring action and as the propeller speeds up and approaches that of engine, potential in armature 3 and current in coil 7 decrease to the point where the magneto-motive force in coil 6 overpowers that in coil 7 and reverses the booster flux. The booster now supplies a potential, energizes the load circuit, increases propeller shaft speed to that of engine and thereafter causes it to overspeed the engine. As soon as propeller begins to overspeed engine, current in the coil 7 automatically reverses, flows in direction of arrow O and aids coil 6 to establish a powerful booster flux and potential operative to increase propeller overspeed. The switch may be adjusted to allow a considerable increase in throttle opening before a further depression closes the contacts 13 and 11. This again short circuits the coil 6 but now weakens the generating flux and causes engine to speed up for greater horse power delivery. If the throttle at this moment is wide open the mechanism is adjusted to allow further depression of accelerator operative to disconnect finger 10 from 11 and to close it with contact 19. The coil 6, formerly traversed by the entire load current in one direction, is now connected in shunt to clutch coil 2, the load current from the armatures dividing between coils 2 and 6, the portion thru coil 6 traversing it in the opposite direction as shown by arrow U. When engine and vehicle operate at high speed the opposition to coil 7, produced by this connection, will merely weaken the booster generating field and still further increase engine speed. However, this connection is particularly provided for the purpose of multiplying the engine torque to propeller for rapid acceleration and hill climbing and the operator need but fully depress his accelerator for this purpose or for a quick getaway. When the vehicle has accelerated to the speed desired he partly releases accelerator which then short circuits coil 6 and reduces engine speed. Immediately thereafter coil 6 is again included and traversed by current in opposite direction which still further decreases engine speed. This condition is maintained over a considerable range of throttle opening and permits normal operation with low and efficient engine speeds.

The operator may bring the vehicle to a stop without stalling his engine as release of accelerator establishes the idling conditions heretofore mentioned.

The change of connections to coil 6 not only reverses the current therethru but also changes the field strength relationship in one dynamo with respect to that in the other. Assuming that clutch coil 2 has 10 turns and a resistance of .01 ohm and that booster coil 6 has 20 turns and a resistance of .04 ohm, and assuming that current in clutch coil is 400 amperes in direction of arrow when accelerator is depressed all the way for production of maximum propeller torque, then current in booster coil is 100 amperes and produces only 2000 ampere turns as against 4000 ampere turns in clutch coil, and when booster coil 6 is reversed current flows thru both coils in series, increasing the booster ampere turns in the ratio of 4–1. It will be seen that by judicious selection of turns and resistances in the two coils any ampere turn ratio between the two connections may be had in order to obtain the maximum desired propeller torque and speed increase.

My invention also provides for changing the booster field strength with armature reaction as the booster field is reversed. To accomplish this I advance the brushes 20 and 21 in direction of booster armature rotation operative to alter the demagnetizing effect of booster armature on its field, in this instance to demagnetize field when current in coil 6 is in direction of arrow U for motoring action and reduced torque, and, if sufficiently advanced, to aid the booster field magnetization and booster torque reaction when current in booster coil has direction O.

In order to produce an effective reverse torque with an apparatus of this nature, the booster torque ability must exceed the propeller torque by the amount of engine torque. Assuming the engine torque as unity and that the propeller torque must be double then the booster torque ability must be three times that of engine and one and one-half times that of clutch. However, ordinarily, such a booster would be unsuited for multiplying engine torque for forward rotation as it would overpower the clutch and prevent load current from building up in the circuit. With my invention the connections of coil 6 for overspeeding in a forward direction are also suitable for production of a good reverse torque. The operator need only change the reversing switch 8 to position R and thereafter slightly depress his accelerator in order to open short circuit of coil 6 and develop a torque in the opposite direction for reversing the vehicle, the accelerator being adjusted, as heretofore set forth, to allow considerable throttle control without disturbing this connection.

In the instance above cited the booster ampere turns with this connection are four times as great as with the other connection, making it possible to use units of moderate size and a booster which is only inconsiderably or no larger than the clutch, and still develop a powerful torque in both directions. In order to further aid production of reverse torque my invention provides for relatively reducing clutch torque with respect to booster torque by shifting the brushes 22 and 23 on the commutator of clutch armature 3 away from the neutral point and in a direction opposite to that of engine rotation, operative, in cooperation with the brushes 20 and 21 in position to strengthen booster torque at this time, to build up a greater reverse torque at the propeller shaft. It should be noted that during reverse operation the coil 7 receives current in direction O from the armature 5, still further strengthening booster field and aiding reverse torque production.

My system is adapted to start the engine from a battery 24 when the switch 25 is closed. With the switch 8 in the position F battery current traverses armature 5 reversely from the direction shown by arrow. Another current flows thru field coil 2 and armature 3. A connection such as the rod 26 is provided between the brake pedal 27 and switch 9 which permits the operator, by depressing the pedal until finger 10 contacts with 19, to establish current flow thru coil 6 and cause the booster to operate as a motor in aid of clutch for engine starting. Such depression also permits operator to interrupt the flow of torque when vehicle is in operation.

It should be noted that the subject matter relating to switching and shortcircuiting the clutch and booster field coils by the accelerator and brake mechanisms are broadly claimed in my copending application Serial No. 296,468 filed July 31, 1928, and that the subject matter for starting the engine from the battery and energizing the booster shunt field coils from one of the dynamos are claimed in my application Serial No. 219,226 filed September 13, 1927.

While I have herein shown a system embodying my invention and described its operation in connection with a motor vehicle I desire to have it understood that my invention is adapted to other uses and that it may be used in whole or in part in the described or other embodiments within the principle and scope of my invention.

Having described my invention, what I claim and desire to secure by Letters Patent is:

1. In a transmission apparatus, a power shaft, a load shaft, a dynamo rotatively connected with one of the shafts having a field coil, a second dynamo rotatively connected with both shafts and electrically connected with the first dynamo having a field coil, and a switch operative in one position to connect the first field coil in multiple with the second field coil to be traversed by a portion of the load current and in another position to connect the first field coil in series with the second field coil to be traversed by substantially the entire load current.

2. In a transmission apparatus, an engine shaft, a load shaft, a dynamo rotatively connected with one of the shafts having a field coil, a second dynamo rotatively connected with both shafts having a field coil, electric connectors between the dynamos, and a switch operative in one position to connect the first field coil to be traversed by a portion of load current in one direction and in another position to connect the first field coil to be traversed by substantially the entire load current in the opposite direction.

3. In combination, an engine having a shaft and a throttle mechanism, a load shaft, a dynamo having a field coil, a second dynamo electrically connected with the first dynamo for transmitting power between the shafts, and a switch operated by the movement of the throttle mechanism in one position to connect the field coil to be traversed by current in one direction and in another position to connect the field coil to be traversed by current in the opposite direction.

4. In a vehicle, the combination of an engine having a shaft, a brake lever, a load shaft, a dynamo rotatively connected with one of the shafts having a field coil, a second dynamo rotatively connected with both shafts, electric connections between the dynamos, and a switch operative by the movement of the brake lever in one position to connect the field coil to be traversed by load current in one direction and in another position to connect the field coil to be traversed by load current in the opposite direction.

5. In a vehicle, the combination of an engine having a shaft, a load shaft, a brake mechanism, a battery, a dynamo rotatively connected with one of the shafts having a field coil, a second dynamo rotatively connected with both shafts, connectors between the dynamos, a switch operative by the movement of brake mechanism to reverse the field coil, and a starting switch adapted to connect battery to the dynamos for starting the engine.

6. In a transmission apparatus, an engine shaft, a load shaft, a dynamo having a field coil, a second dynamo electrically connected with the first dynamo for transmitting power between the shafts, an electric circuit including the field coil, and a switch operative to progressively change the field coil connections first to shortcircuit the field coil and thereafter to include it in the circuit in reverse direction.

7. In combination, an engine having a shaft and a throttle mechanism, a load shaft, a dynamo having a field coil, a second dynamo electrically connected with the first dynamo for transmitting power between the shafts, connectors for passing current from one of the dynamos thru the field coil, and means operative by the movement of the throttle mechanism for reversing the current in said field coil.

8. In a vehicle, the combination of an engine having a shaft, a load shaft, a brake mechanism, a dynamo having a field coil, a second dynamo electrically connected with the first dynamo for transmitting power between the shafts, connectors for passing current from one of the dynamos thru the field coil, and means operative by the movement of the brake mechanism for reversing the current in said field coil.

9. In combination, an engine shaft, a load shaft, a dynamo having a plurality of field coils, a second dynamo electrically connected with the first dynamo for transmitting power between the shafts, connectors for passing shunt current thru one of the field coils and load current thru a second field coil from one of the dynamos, and means for reversing the load current thru the second field coil.

10. In a vehicle, the combination of an engine having a shaft and an accelerator mechanism, a load shaft, a dynamo having a field coil, a second dynamo electrically connected with the first dynamo for transmitting power between the shafts, and a switch operative when in one position to shortcircuit the field coil and operative by depression of the accelerator to progressively change the field coil connections so as to open the short circuit, then to close the shortcircuit and thereafter to reverse the field coil.

11. In a vehicle, the combination of an engine having a shaft, a load shaft, a brake mechanism, a dynamo having a field coil, a second dynamo electrically connected to the first dynamo for transmitting power between the shafts, and a switch operative when in one position to shortcircuit the field coil and operative by depression of brake mechanism to progressively change the field coil connections so as to open the short circuit, then to close the shortcircuit and thereafter to reverse the field coil.

12. In combination, an engine shaft, a load shaft, a dynamo rotatively connected with both shafts having an armature and a field coil, a second dynamo rotatively connected with one of the shafts having a field coil, a reversing switch for the first dynamo, and a second switch operative to connect the field coils in multiple for operation of first dynamo as a generator when reversing switch is in one position and to connect the field coils in series for operation of first dynamo as a motor when reversing switch is in another position.

13. In combination, an engine shaft, a load shaft, a dynamo rotatively connected with both shafts having an armature winding and a field winding, a second dynamo rotatively connected with one of the shafts and electrically connected with the first dynamo for transmitting power between the shafts, a reversing switch adapted to reverse the armature winding with respect to the field winding and the direction of rotation of load shaft, and means for establishing a fixed angular displacement between the magnetomotive forces in the windings of first dynamo operative to produce a relatively strong torque between the windings when reversing switch is in one position and to produce a relatively weaker torque when reversing switch is in another position.

14. In combination, an engine shaft, a load shaft, a dynamo rotatively connected with one of the shafts having an armature element and a field element, a second dynamo rotatively connected with both shafts and electrically connected with the first dynamo for transmitting power between the shafts, means for operating first dynamo as a generator in one stage and as a motor in another stage, and means for establishing a fixed angular displacement between the magnetomotive forces in the elements of first dynamo operative to produce a relatively strong torque when first dynamo operates in one stage and a relatively weaker torque when first dynamo operates in another stage.

Signed at Newark in the county of Essex and State of New Jersey this twenty-fourth day of July, A. D. 1928.

ALFONS HENRY NEULAND.